United States Patent Office 3,515,552
Patented June 2, 1970

3,515,552
LIGHT-SENSITIVE IMAGING SHEET AND METHOD OF USING

George H. Smith, Maplewood, Minn., assignor to Minnesota Mining and Manufacturing Company, St. Paul, Minn., a corporation of Delaware No Drawing. Filed Sept. 16, 1966, Ser. No. 579,838
Int. Cl. G03c *1/68*
U.S. Cl. 96—35.1 8 Claims

ABSTRACT OF THE DISCLOSURE

A photosensitive imaging sheet employing a cationically polymerizable vinyl ether in conjunction with a photoinitiator which liberates halogen free radicals.

This invention relates to photopolymerization and in particular to novel photopolymerizable compositions and articles made therewith. One important field of utility is in connection with the recording of light-images.

Both photopolymerizations and cross-linking reactions have previously been suggested for copying purposes. An early process employed sheet materials coated with dichromated gelatin, which under the influence of light becomes insoluble; but the sensitized product is unstable, and excessive exposure to the light-image is required. Many more recent processes have involved free radical propagated polymerization, the free radicals being obtained by photolytic action. Such reactions, although requiring much less exposure because of the amplification factor inherent in a chain reaction, have generally been found to be oxygen-sensitive and therefore to give inadequate reproducibility. Ionic polymerization reactions, which are not inhibited by molecular oxygen, have also been suggested in copying processes. Thus, U.S. Pat. No. 3,196,098 describes such systems employing certain exotic boron compounds as photoinitiators for the photopolymerization of cationically polymerizable monomers. Although the systems there described are not affected by atmospheric oxygen, they still require relatively high levels of exposure, several minutes up to two hours under a mercury arc lamp being suggested; and the initiator compounds are not easily obtained.

It has now been found possible to provide compositions, particularly in the form of thin films or coatings, which are capable of undergoing photolytically induced polymerization under the influence of visible light as well as ultraviolet radiation, unaffected by the presence or absence of molecular oxygen and under attractively low levels of exposure, and which are composed of readily available components including, surprisingly, compounds which on exposure liberate free radicals. More specifically, these compositions and coatings consist essentially of one or more vinyl ethers as the polymerizable component, together with at least one organic halogen-containing photoinitiator compound and at least one hydrogen donor compound, and if desired with the further addition of a photosensitizing dye component, as means for initiating the polymerization of the vinyl ether under exposure to radiation of suitable wavelength.

Under brief exposure to a light-image, and particularly when exposed at moderately elevated temperature or when subsequently briefly heated, the film or coating undergoes polymerization sufficient to permit the formation of a visible record of the light-image.

The visible image may be formed during the exposure or during subsequent heating, for example by heat-induced fusion and transparentization of the initially opaque film at exposed areas to permit viewing of a contrasting surface therebeneath. The visible image may be developed on the exposed surface, for example by application of a liquid or powder which is selectively retained on one or the other of the exposed or underexposed portions, or by selective solution or swelling of the exposed or underexposed portions. A presently preferred procedure involves selective transfer of one or the other of the exposed or underexposed portions of the coating either partially or entirely to a suitable receptor surface where the transferred material may then if desired be made more readily visible by toning with a liquid or powder, or by chemical reaction, or by any other applicable procedure. More specifically, it is preferred to expose the sensitive sheet briefly to a light-image, to continue the polymerization by moderate application of heat while the exposed surface is in contact with a receptor sheet, and to develop or make visible the areas of the receptor sheet corresponding to the underexposed areas of the sensitive sheet by application of an image toner or developer in powder form.

A class of halogen-containing hydrocarbon compounds which produce free radicals upon exposure to light of suitable wavelength has been defined in a series of patents, of which U.S. Pat. No. 3,042,516 may be taken as illustrative. The compounds are there used in the formation of colored reaction products rather than in an attempt to induce polymerization. These and other liquid or preferably solid organic compounds containing halogen attached to carbon and having bond dissociation energies for the carbon-halogen bond of between about 40 and about 70 kilogram calories per mol, and which additionally are neither strongly acidic nor strongly basic, and which on exposure to light of suitable wavelength are dissociable with formation of halogen free radicals, are now unexpectedly found to be useful in the photoinitiation of cationic polymerizations, as in the practice of the present invention. With compounds having dissociation energy levels for the carbon-halogen bond below about 40 the resulting copy-sheet is unstable and undergoes gradual and detrimental change under normal storage conditions. Above about 70 kg. cal./mol excessive radiation exposure is required in order to initiate the polymerization reaction.

The effectiveness of the halogen-containing photoinitiators for the present purpose is surprising in view of their known tendency to produce free radicals on exposure to actinic radiation, and the difficulties normally experienced with free radical initiated polymerization reactions in copy-sheet formulations, taken together with the recognition that the vinyl ethers are polymerizable by an ionic rather than a free radical mechanism. As previously noted, free radical reactions are normally strongly influenced by the presence of atmospheric or molecular oxygen; and various attempts to overcome this difficulty have been made. As an example, in U.S. Pat. No. 3,202,508 the reactive layer is isolated from atmospheric oxygen by means of a protective film enclosure which must be removed prior to the final transfer and image development steps. In the present case, and using the halogen-containing photoinitiators with vinyl ethers and with hydrogen donor materials, no such precautions are required and the polymerization proceeds independently of the presence or absence of molecular oxygen.

Although the explanation is not known with certainty, the discovery of the utility of these materials as photosensitive coatings makes it appear probable that halogen free radicals first produced on adequate exposure of the films of the present invention react immediately with hydrogen atoms available from a hydrogen donor component to form hydrogen halide which then serves to initiate with the ionically polymerizable vinyl ether a cationic polymerization. Sources of hydrogen are conveniently present in the vinyl ether itself, in the organic binders ordinarily employed as viscosity control agents or carriers, in the plasticizers or traces of solvent remaining in the coating, or from other sources. But regardless of theory, the invention provides novel compositions which, particularly in the form of thin coatings or strata on a suitable carrier or support, are capable of being altered in physical properties, e.g. in physical appearance, or in softening temperature, or in solubility, by brief exposure to radiant energy of suitable wavelength, unhampered by any sensitivity toward oxygen.

The photopolymerizable compositions of this invention may consist exclusively of a mixture of photoinitiator and solid or semisolid vinyl ether, but will preferably contain additional components such for example as film-forming binders, sensitizing dyes, coloring or opacifying agents, tackifiers, plasticizers or softeners, fusible particles or other modifiers, diluents or extenders. The amount and kind of such additives may cover a wide range, provided only that the vinyl ether and photoinitiator are present in sufficient concentration to produce a developable differential under localized exposure and that the additives do not inhibit the photoploymerization. Although unsupported films are also contemplated, the sheet materials of the invention will ordinarily include a carrier or backing such as paper, film or foil, the photopolymerizable composition being present as a thin uniform coating or deposit on a major surface thereof. With sufficient added film-forming binder to form a sufficiently firm mixture, liquid vinyl ethers and liquid photoinitiators may form useful coatings on such supports; but the normally solid vinyl ethers and photoinitiators, together with a minimum of added binder material, are preferred both for permanency and as providing maximum differential between exposed and underexposed areas of the coating.

The vinyl ethers as a class are characterized as undergoing more rapid polymerization than other cationically polymerizable materials, and many of them are commercially available.

Illustrative of the preferred normally solid vinyl ethers are such compounds as

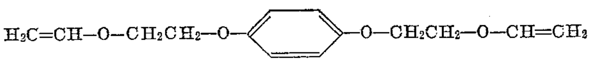

p-di-2-vinyloxyethoxy benzene

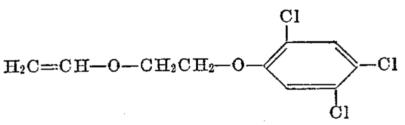

2,4,6-trichlorophenoxyethyl vinyl ether

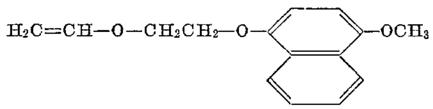

p-methoxynaphthoxyethyl vinyl ether

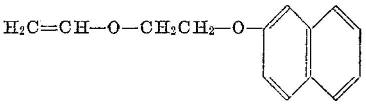

β-naphthoxyethyl vinyl ether

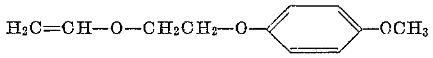

p-methoxyphenoxyethyl vinyl ether

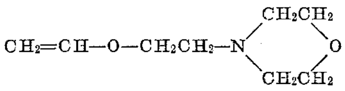

N-(β-vinyloxyethyl) morpholine

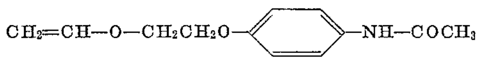

p-acetamidophenoxyethyl-vinyl ether

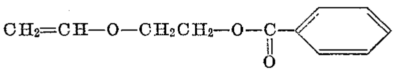

2-vinyloxyethyl benzoate

The compound cetyl vinyl ether $$H_2C{=}CH{-}O{-}CH_2(CH_2)_{14}CH_3$$

is an example of liquid vinyl ethers which may be used in conjunction with film-forming solid binders to provide photopolymerizable coatings which are too soft for many storage conditions but which are capable of making useful copies, as will subsequently be shown.

The following illustrative halogen-containing organic compounds have been found useful as photoinitiators: carbon tetrabromide; tetra(bromomethyl)-methane; tetrabromoethylene; 1,2,3,4 - tetrabromobutane; trichloroethoxyethanol; p-iodophenol; p-bromophenol; p-iodobiphenyl; 2,6-dibromophenol; 1-bromo-2-naphthol; p-bromoaniline; hexachloro-p-xylene; trichloroacetanilide; p - bromodimethylaniline; tetrachlorotetrahydronaphthalene; α,α' - dibromozylene; α,α,α',α' - tetrabromoxylene; hexabromoethane; 1 - chloroanthraquinone; ω,ω,ω - tribromoquinaldine; hexabromocyclohexane; 9-bromofluorene; bis(pentachloro)cyclopentadienyl; and polyvinylidene chloride. Strongly acidic halogen-containing organic compounds such for example as p-bromobenzoic acid, and which are capable of initiating the polymerization of the vinyl ethers in the absence of light or other activating radiation, are excluded. Also excluded are strongly basic halogen-containing organic compounds, which interfere with the photopolymerization. The photoinitiator compounds, while dissociable under exposure to radiation of suitable wavelength, must in the absence of such radiation neither initiate nor inhibit the polymerization; that is, they must be chemically inert toward the monomer system employed.

The following examples, in which all parts are by weight unless otherwise specified, will further illustrate the practice of the invention.

EXAMPLE 1

A master solution of vinyl ether and film-forming binder in a volatile solvent is first prepared, containing

| | Parts |
|---|---|
| β-Naphthyloxyethyl vinyl ether | 3.0 |
| Cellulose acetate butyrate | 1.5 |
| Acetone | 58 |

A series of solutions is prepared and tested, each containing two parts of the master solution plus the indicated amount of the specified halogen-containing organic photoinitiator compound. The solution is uniformly coated on "Mylar" polyester film using a coating knife at an orifice of one mil. The coating is dried and portions are then exposed through a stencil to UV light from a GE H3T7 1000 watt UV lamp at ten inches for increasing periods of time until an exposure time is reached which is just sufficient to permit the exposed areas to be removed, without transfer, from a paper receptor surface against which the specimen is pressed for five seconds at a temperature of 90° C. Minimum non-transfer exposure time in seconds is reported for each photoinitiator. A sheet is then exposed through the stencil using the minimum exposure time as thus determined, and the underexposed portions transferred to bond paper, again by hot pressing for five seconds at 90° C. prior to stripping. Dusting of the receptor surface with a toner powder and removal of surplus powder then produces a visible record in each instance.

In some instances dusting is effectively accomplished with the sheet at room temperature, the transferred traces of the coating remaining in super-cooled liquid condition for at least several minutes after cooling to room temperature. In all cases the toning may be carried out with the sheet at moderately elevated temperature.

It will be understood that the specific exposure time here indicated does not represent an absolute value for the system represented, being affected by variations inherent in the type of test procedures employed; but the results given are effective in establishing trends, in comparing classes of materials, and in illustrating the practice of the invention.

| Sample | Halogen-containing photoinitiator compound | Parts | Time |
|---|---|---|---|
| 1 | Tetrabromobutane | .01 | 4 |
| 2 | do | .003 | 10 |
| 3 | Tetrabromoxylene | .02 | 5 |
| 4 | do | .005 | 5 |
| 5 | Dibromoxylene | .02 | 5 |
| 6 | Carbon tetrabromide | .02 | 5 |
| 7 | Carbon tetrabromide | .003 | 10 |
| 8 | Tetra(bromomethyl)methane | .03 | 60 |
| 9 | p-Iodobiphenyl | .03 | 30 |
| 10 | Tetrachlorotetrahydronaphthalene | .03 | 60 |
| 11 | Hexachloroxylene | .03 | 40 |
| 12 | do | .02 | 30 |
| 13 | do | .01 | 30 |
| 14 | do | .005 | 40 |
| 15 | Trichloroacetanilide | .03 | <5 |
| 16 | do | .02 | 15 |
| 17 | l-chloroanthraquinone | .03 | 60 |
| 18 | Tribromoquinaldine | .02 | <5 |
| 19 | do | .01 | <5 |
| 20 | do | .005 | 5 |
| 21 | Trichloroethoxyethanol | .03 | 60 |
| 22 | p-Iodophenol | .03 | 30 |
| 23 | p-Bromophenol | .03 | 30 |
| 24 | 2,6-bromophenol | .03 | 30 |
| 25 | l-bromo-2-naphthol | .03 | 10 |
| 26 | do | .02 | 15 |
| 27 | do | .01 | 10 |
| 28 | do | .005 | 10 |
| 29 | p-Bromodimethylaniline | .03 | 130 |
| 30 | p-Bromoaniline | .03 | 130 |
| 31 | p-Bromofluorene | .02 | 10 |
| 32 | do | .01 | 7 |
| 33 | do | .005 | 5 |
| 34 | do | .003 | 5 |
| 35 | Bis(pentachloro)cyclopentadienyl | .03 | 45 |
| 36 | Polyvinylidene chloride | .03 | 60 |

In a variation of the procedure used with the foregoing samples, the coated sheet is exposed for a predetermined period and the time of heating required to permit removal without transfer from the bondpaper is then determined. As an example, a test sheet coated with a mixture of β-naphthyloxyethyl vinyl ether and tetrabromoxylene as in Samples 3 and 4, is exposed as there indicated for five seconds. When heated against bondpaper for five seconds at 90° C., transfer of the coating occurs over the entire area. Heated for ten seconds or longer, transfer occurs at unexposed (underexposed) areas but not at the exposed areas, and a visible record is produced by development with a colored powder.

EXAMPLE 2

To a mixture of the indicated amount of the specified photoinitiator in two parts of a master solution prepared as in Example 1 is added approximately .004 part of the specified sensitizing dye as shown in the accompanying tabulation, the test procedures and minimum exposure time being as described in Example 1 except that the light source is a tungsten filament glass envelope lamp providing an exposure intensity of about 10,000 foot-candles, mainly in the visible range. A visible record is produced in each instance using the exposure time indicated.

| No. | (1) Halogen-containing photoinitiator (2) Dye | Parts | Exposure time |
|---|---|---|---|
| 1 | (1) Tribromoquinaldine (2) Dye I | .005 | 3 |
| 2 | (1) Tetrabromoxylene (2) Dye I | .05 | 15 |
| 3 | (1) Carbon tetrabromide (2) Dye I | .005 | 8 |
| 4 | (1) 9-bromofluorene (2) Dye I | .005 | 20 |
| 5 | (1) Tribromoquinaldine (2) Dye II | .05 | 15 |
| 6 | (1) Tetrabromoxylene (2) Dye II | .05 | 25 |
| 7 | (1) Carbon tetrabromide (2) Dye II | .005 | 25 |
| 8 | (1) Tribromoquinaldine (2) Dye III | .05 | 3 |
| 9 | (1) Tetrabromoxylene (2) Dye III | .05 | 15 |
| 10 | (1) Carbon tetrabromide (2) Dye III | .05 | 2 |
| 11 | (1) 9-bromofluorene (2) Dye III | .05 | 3 |
| 12 | (1) Tribromoquinaldine (2) Dye IV | .05 | 6 |
| 13 | (1) Tetrabromoxylene (2) Dye IV | .05 | 25 |
| 14 | (1) Carbon tetrabromide (2) Dye IV | .05 | 5 |
| 15 | (1) Tribromoquinaldine (2) Dye V | .05 | 3 |
| 16 | (1) Tetrabromoxylene (2) Dye V | .05 | 25 |
| 17 | (1) Carbon tetrabromide (2) Dye V | .005 | 5 |
| 18 | (1) 9-bromofluorene (2) Dye V | .05 | 15 |
| 19 | (1) Hexachloro-p-xylene (2) Dye VI | .05 | 25 |

The specific dyes are identified as follows:

Dye I—[2-(3-ethyl-benzothiazoline)]-[5′-(2′-thio-3′-allyl thiazolid-4′-one)] dimethin merocyanine Dye II—Acridine Red Dye III—Bis 2(3-ethyl benzothiazole)-2′-methyltrimethincyanine bromide Dye IV—[2-(3-ethyl thiazolidine)][5′-(3′-ethyl-2′-thio-thiazolid-4′-one)] dimethin merocyanine Dye V—[2-(3-methyl-thiazolidine)][5′-(3′-allyl-2′-thio-thiazolid-4′-one)] dimethinmerocyanine Dye VI—"Setoflavin T" (CI 49005)

Sensitizing dyes which render the compositions sensitive to visible light are primarily from the classes of xanthene, thiazole, polymethine and acridine dyes. The presence of the dye adds sufficient color in some instances to provide a visible transfer image requiring no further powder development.

EXAMPLE 3

To one ml. of a five percent solution of trichlorophenoxyethyl vinyl ether in acetone is added six drops of a 15% solution of polyvinylidene chloride in acetone. The solution is lightly and uniformly applied over a sheet of thin tracing paper on a whirling disc and the coating is dried, all under dark-room conditions. The coated sheet is exposed through a photographic transparency to radiation from a BH–6 high pressure mercury vapor lamp at ten inches for 30 seconds. It is then placed with its coated surface in light pressure contact with the surface of a receptor sheet of plain bond paper, heated for four seconds at 115° C., and then stripped away. Carbon black is dusted over the receptor paper surface, and the excess removed by shaking and blowing. A reproduction of the transparency is obtained. Substitution of colored fusible resin toner powder for the carbon black permits subsequent heat fusion or "fixing" of the image.

EXAMPLE 4

To one ml. of a five percent solution of p-methoxynaphthoxyethyl vinyl ether in acetone is added ten drops of a ten percent solution of hexachlorooxylene in acetone. The mixture is whirl coated on 30 lb./ream map overlay tracing paper. The coating is dried and the sheet is exposed through a stencil to radiation from the BH–6 lamp for 45 seconds. The unexposed portions of the coating are transferred to plain paper and there rendered visible by the procedure described in Example 3.

The same results are obtained using a mixture of 0.02 gram of tetrabromoethylene in one ml. of five percent solution of p-methoxynaphthoxyethyl vinyl ether in acetone, and exposing for 30 seconds.

The latent image occurring in the copy-sheet coating after exposure to a light-pattern as in Examples 3 and 4 may equally well be rendered visible by incorporating color or color-forming bodies in the coating so that the transferred image portions are directly visible.

EXAMPLE 5

To one ml. of a 10% solution of trichlorophenoxyethyl vinyl ether in acetone is added 16 drops of a five percent solution of tribromoquinaldine in acetone, 16 drops of a 10% solution of cellulose acetate butyrate in acetone, and eight drops of a one percent solution of fluorescein in methanol. The solution is whirl coated on thin translucent paper and dried, all under darkroom conditions. The sheet is placed over an original printed in black ink and the composite is exposed in reflex position for 60 seconds to light from tungsten filament lamps at an intensity of 8000 foot-candles. The coated sheet is removed from the original and is then heated briefly in contact with plain bond paper and removed. The latent image remaining on the bond paper is developed with colored fusible powder and fixed by brief heating. A distinct copy of the original is obtained.

Substantially equivalent results are obtained with each of the following sensitizers replacing the fluorescein, with appropriate changes in time of exposure between about 15 and about 90 seconds, and with sufficient heating to ensure separation of the image and non-image areas.

acriflavin
p-dimethylamino-benzal (phenyl) pyrazolone
Rhodamine B base
Seto Flavin T
7-dimethylamino-4-methyl coumarin
5-p-dimethylaminobenzal rhodamine
proflavin hydrochloride
2-diethylamino-9-fluorenone
acridine
3,3'-diethyl oxacarbocyanine iodide
quinoline yellow
p-dimethylaminostyryl quinoline
bis(1-ethylquinoline-2)-trimethincyanine iodide
3 - ethyl - 2-thio-5-$\beta$-(3-methyl-2-benzothiazolinylidene)-(carboxyethyl) ethylidene thiazolid-4-one
2 - p-dimethylaminostyryl-3-methyl benzothiazoliumtoluene-p-sulfonate

EXAMPLE 6

A stock solution is first prepared containing one gram of cetyl vinyl ether and one gram of cellulose acetate in 25 ml. of acetone. To two ml. of the solution is added .001 gram of p-nitrobenzyl bromide. The mixture is knife coated through a one-mil orifice on a polyester film, and dried. The coating is exposed through a stencil to radiation from a GE H3T7 UV lamp at 10 inches for 60 seconds. It is then placed against the surface of plain bond paper and the two surfaces are pressed together with a paper-hanger's rubber roller under strong hand pressure. The coated film is stripped from the paper, leaving a deposit at the unexposed areas which is then developed to a visible image, corresponding to the open areas of the stencil, by application of colored powder.

EXAMPLE 7

To two ml. of a solution of one gram of p-acetamidophenyloxyethyl vinyl ether and one-half gram of cellulose acetate butyrate in 25 ml. of acetone is added 0.01 gram of tetrachloro-o-xylene. The solution is coated through a one-mil orifice on a polyester film. On drying, the coating is crystalline and opaque. It is exposed through a stencil for 40 seconds to radiation from the H3T7 lamp at ten inches and is then cautiously and uniformly heated at 100° C. for a few seconds. The light-exposed areas fuse and become transparent. Transparency is retained on cooling the sheet to room temperature. A uniformly colored background placed beneath the sheet makes the transparent areas readily visible; or they can be powder developed at 100° C.

The same results are obtained with m-di-2-vinyloxyethoxy benzene as the crystallizable monomer except that the development temperature is between 72° and 76° C.

EXAMPLE 8

A solution of .01 gram of tetrabromo-o-xylene in two ml. of a solution of five grams of the tris-vinyloxyethyl ether of the commercial triphenylol propane obtainable under the trade name "UCAR Triphenol P" in 95 ml. of acetone is uniformly coated on a smooth flat aluminum plate which has previously been treated with dilute sodium silicate solution, washed with water, and permitted to dry. The coating is dried and is then exposed through a mask for 60 seconds to radiation from the H3T7 lamp at ten inches. The surface is sprayed with acetone to remove unpolymerized monomer, and is wiped with an aqueous lithographic fountain solution and then with lithographic ink. The ink adheres preferentially to the light-exposed areas. A number of prints are taken on plain bond paper by the lithographic offset method.

The ability to form an insoluble polymer on brief irradiation makes possible the preparation of copies of transparencies, stencils or the like by procedures involving preferential solution and removal of monomer at underexposed areas of thin films or coatings of the mixture of vinyl ether and photoinitiator.

What is claimed is as follows:

1. An article adapted for use in recording a light-image and having a photosensitive stratum consisting essentially of a cationically polymerizable vinyl ether and a halogen-containing organic photoinitiator compound which on exposure to radiation of suitable wavelength is dissociable with formation of halogen free radicals, the bond dissociation energy for the carbon-halogen bond being not lower than about 40 and not higher than about 70 kilogram calories per mol, and said photoinitiator compound being chemically inert in said stratum in the absence of said radiation.

2. The article of claim 1 wherein said photoinitiator compound is a halogenated hydrocarbon.

3. The article of claim 1 wherein said stratum includes a film-forming polymeric binder.

4. The article of claim 1 wherein said stratum includes a sensitizing dye and is photosensitive within the range of visible light.

5. The method of recording a light-image comprising: exposed to said light-image an article having a photosensitive stratum consisting essentially of a cationically polymerizable vinyl ether and a halogen-containing organic photoinitiator which on exposure to radiation of said light-image is dissociable with formation of halogen free radicals, the bond dissociation energy for the carbon-halogen bond being not lower than about 40 and not higher than about 70 kilogram calories per mol, and said photoinitiator compound being chemically inert in said stratum in the absence of said radiation, and subjecting the exposed stratum to heat, to produce in said stratum a physical and/or chemical differential between the exposed and the underexposed portions of said stratum; and utilizing said differential in the development of a visible record of said light-image.

6. The method of claim 5 wherein the visible record is developed by a procedure including effecting a physical separation between the exposed and the underexposed areas of said stratum.

7. The method of claim 6 wherein separation is effected by transfer at underexposed areas to a receptor surface.

8. The method of claim 7 wherein the transferred portions of said stratum are powdered-developed.

References Cited

UNITED STATES PATENTS

| | | | |
|---|---|---|---|
| 3,395,014 | 7/1968 | Cohen et al. | 96—28 |
| 3,380,831 | 4/1968 | Cohen et al. | 96—115 |
| 3,042,516 | 7/1962 | Wainer | 96—115 |
| 3,347,676 | 10/1967 | Cripps | 96—115 |
| 3,046,125 | 6/1962 | Wainer | 96—115 |
| 1,658,510 | 2/1928 | Beebe et al. | 96—115 |

RONALD H. SMITH, Primary Examiner

U.S. Cl. X.R.

96—115, 87